Aug. 7, 1934.  F. W. METZGER  1,968,953
INSECT TRAP
Filed April 10, 1933
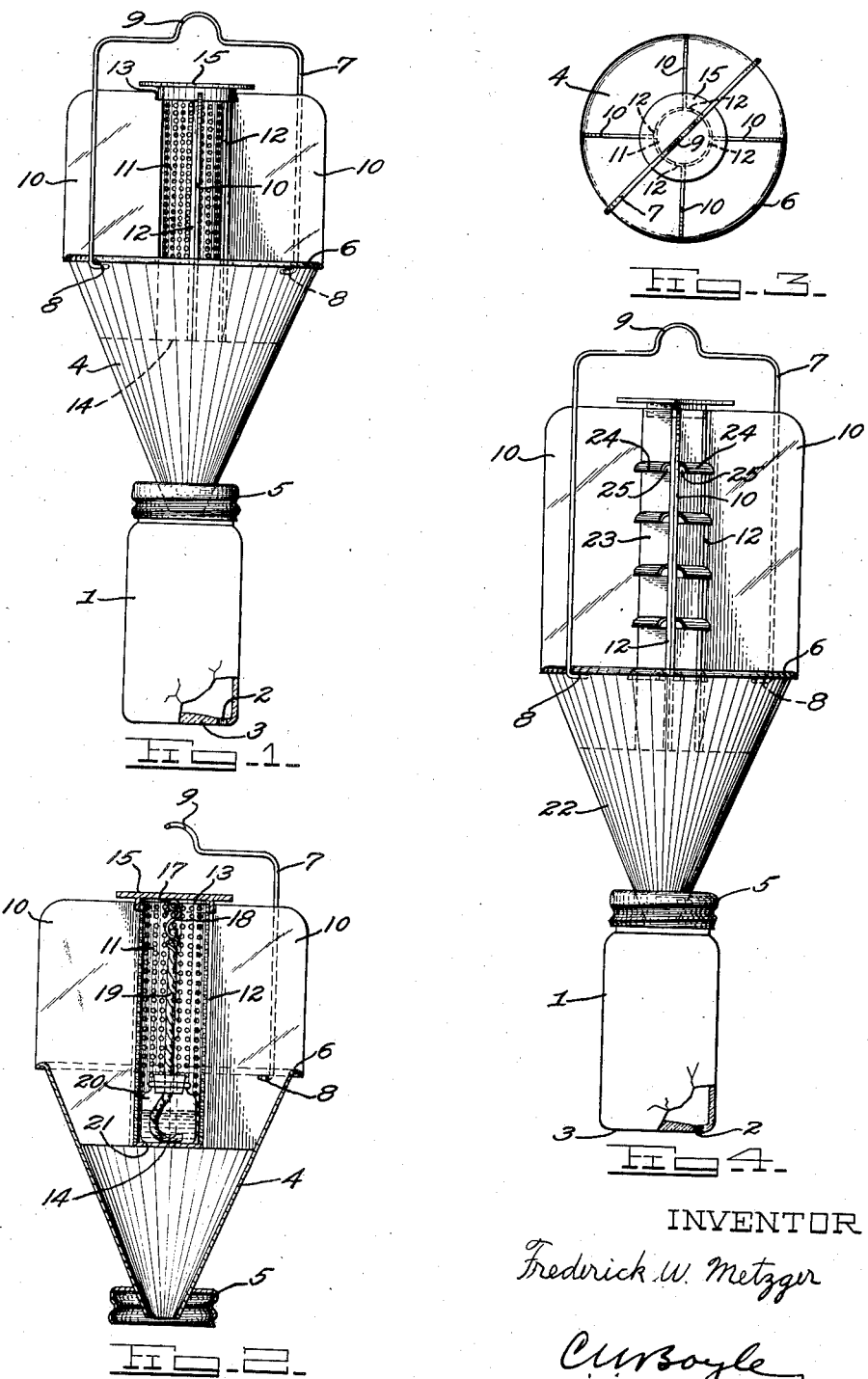
INVENTOR
Frederick W. Metzger
BY C. W. Boyle
ATTORNEY Patented Aug. 7, 1934

1,968,953

UNITED STATES PATENT OFFICE 1,968,953

INSECT TRAP

Frederick W. Metzger, Moorestown, N. J., dedicated to the free use of the Public Application April 10, 1933, Serial No. 665,407

1 Claim. (Cl. 43—107)

(Granted under the act of March 3, 1883, as amended April 30, 1928; 370 O. G. 757)

This application is made under the act of March 3, 1883, as amended by the act of April 30, 1928 and the invention herein described, if patented, may be manufactured and used by or for the Government for governmental purposes without the payment to me of any royalty thereon.

I hereby dedicate the invention herein described to the free use of the Public in the territory of the United States of America to take effect upon the granting of a patent to me.

This invention relates to insect traps and more particularly to improvements in traps for catching flying insects, particularly the Japanese beetle, although insects of many other species have been and may be captured and destroyed.

In trapping the Japanese beetle, particularly, the attractants necessary to draw this insect to the trap, induce, to the said trap, many individuals which are not captured, and there is no existing device which thus captures all beetles thus attracted. Beetles attracted, but not caught, increase the infestation in the vicinity of a trap so that a device with a low efficiency in respect to capturing the attracted beetles is of little value.

The object of my trap and the improvements thereof is to provide an inexpensive and efficient device into which a large percentage of the beetles or other insects attracted will pass, and will be prevented from leaving.

The means of ingress in traps of this nature is usually provided in a funnel or conduit whereby attracted insects upon striking its interior, or projections extending therefrom, are precipitated by gravity into a receptacle from which they cannot escape. It is highly desirable to attract the insects directly to this funnel or to cause them to strike the baffle projecting upward therefrom whereupon they are precipitated into the receptacle. Nor can the funnel or conduit leading to the receptacle be of too great a length, otherwise the insects will take wing before being precipitated into the receptacle.

Attracted insects, particularly the Japanese beetle, show a pronounced tendency to strike traps at some distance below the funnel when the bait is located below this member. It is thus desirable that the bait or attractants for the Japanese beetle or other insects be located above the funnel since insects striking the exterior lower portions of the trap have no means of ingress.

A further desirable feature is that this said non-effective area be made as small as possible in order that a greater number of the insects attracted will fly directly to those portions of the trap whereby they may be captured.

Several methods have been developed whereby the attractants may be volatilized to draw insects to the trap, but preferred means are those which dispense the vapors from the attractants in liquid or cake form. To this end a container is provided whereby various types of bait may be used interchangeably according to the desire of the operator.

Still another advantage of my device is the elimination of additional items in construction such as special drainage and ventilation outlets. This simplicity is further characterized by the union of all the elements with the exception of the bait container top into a single unit.

The inclusion of these unique features renders the production and use of my device comparatively inexpensive as compared with other traps of a similar nature and usefulness.

With these and other objects in view I now give a detailed description of the various features of construction which I have proven, by actual test, are capable of accomplishing the result desired and which are illustrated in the following drawing wherein I have shown my invention in two different types of traps.

In the drawing Fig. 1 is a side elevation of the novel trap; Fig. 2 is a sectional view of the baffle plates; bait container associated with the trap, and Fig. 4 Fig. 3 is a top plan view of the trap in a modified form. is a side elevation of the trap in a modified form.

In describing my invention I first refer to Figs. 1 and 2 wherein is shown a beetle or insect container 1 consisting of an ordinary jar of the "Mason" type although any suitable container equipped with a screw top 5 may be employed. This container 1 has a perforation or perforations 2 in the bottom 3 so that liquids flowing through the tapered funnel or conduit 4 may pass readily through the container. As a conduit for the passage of the beetles or insects into the container 1 there is provided a tapered funnel 4, the smaller end of which extends into the top of the beetle container 1 through an appropriate opening in the flat surface of the screw top 5. This opening is sufficiently large so that when the spreading walls of the funnel or conduit 4 come in contact with the edges of the opening in the screw top 5, the smaller end of the tapering funnel 4 extends into the upper portion of the container 1 and provides an entrance into the container. The funnel or conduit is rigidly attached to the screw top, which is internally screw-threaded as illustrated, by which it is enabled to engage the external screw threads of the upper end of the insect container and to which it is so attached when in use. The rim 6 at the larger end of the funnel 4 is curled slightly in the manner illustrated to afford as little space as possible for attracted insects to crawl about the rim so that individuals attempting to alight thereon will be precipitated into the container.

The bail 7 is inserted through apertures 8 on opposite sides of the funnel 4 and is equipped with a loop 9 in the center of its upper horizontal surface which provides a convenient means of keeping the device on a level plane when suspended from a standard inserted in the ground and said trap should be so suspended in order to operate in a satisfactory manner.

The 4-winged baffle 10 is attached to the funnel 4 and extends downward into the funnel 4 for one-third of its length and upward for two-thirds of its length which is a preferred position.

The plates of the baffle are formed in the shape of a cross to divide the upper portion of the funnel or conduit into separate passages through which the beetles drop when they come in contact with the baffle plates.

The bait container 11 is preferably constructed of uniformly perforated metal plate to allow proper dispensation of the attractive vapors for approximately its entire length and is located intermediate the four wings of the baffle 10 as shown in the drawing, being soldered or otherwise attached thereto by the angular sections 12 of the baffle 10. This container 11 is preferably as long as the baffle with its upper and lower ends coinciding with the respective portions of the baffle at 13 and 14. The bait container 11 is surmounted by a flat removable cover 15 which projects laterally beyond said container to afford protection from rain. Said cover 15 serves an additional purpose when bait dispensed by a wick is employed in the container 11, being equipped on its lower surface 16 with a metallic loop 17 to engage a hook 18 attached to the wick 19 in the manner illustrated. The said container 11 is of a preferred size and shape so that the proper quantity of the attractive branbase bait for efficient operation may be placed therein and also that the liquid attractants may be placed in a bottle or other suitable receptacle of convenient size 20 resting on the bottom 21 of the bait container 11 and be dispensed by the said wick 19, considerable vertical space being provided for the exposure of said wick. If, however, it is desired to employ a cake-type of bait, said container is also of preferred size for the use of said bait.

In Fig. 4 of the drawing I have illustrated my invention in a slightly different type of trap. In this device the parts 1, 2, 3, 5, 6, 7, 8, 9 and 10 are identical with the parts correspondingly numbered in Fig. 1 of the drawing. One departure from the device shown in Fig. 1 is that the funnel 22 is of a length equal to the length of the baffle 10 projecting above said funnel 22, which is a preferred type of construction in that it reduces the non-effective section of the trap itself to an area corresponding to that section whereby beetles can be captured. This feature further reduces the cost of construction. The bait container 23 is mounted in the baffle 10 in a manner similar to the device previously described. Said container 23 is, however, of somewhat different construction than the heretofore mentioned structure 11, being equipped with several downwardly and outwardly projecting flaps 24 formed by cutting the walls of the container 23 to allow the escape of attractive vapors through the apertures 25. This container 23 affords more protection to the bait than does the container 11, but the latter may be employed without prejudice. Said container 23 is also of a preferred size and shape which permits the use of bait in several forms.

It will be readily understood that my device may be constructed so that said funnel 4 may be used with said container 23 and said funnel 22 with said container 11.

Having fully disclosed my discovery I claim as my invention:

In an insect trap having an insect container and a downwardly tapered conduit projecting vertically from the container, a baffle projecting vertically from and above said conduit comprising a central tubular section closed at its lower end, and having perforations in its wall, baffle plates radially and rigidly secured to the wall of the tubular section and coextensive therewith in length, the length of the baffle plates above the conduit being greater than the exposed portion of the conduit and a removable cover having a loop centrally secured to its undersurface, and extending laterally beyond the tubular section to protect its perforated wall from rain, a liquid bait receptacle positioned in the bottom of the tubular section, a wick suspended from the loop in said cover and passing through the tubular section into the bait receptacle.

FREDERICK W. METZGER.